United States Patent
Swam (10) Patent No.: US 6,728,367 B1
(45) Date of Patent: Apr. 27, 2004

(54) APPARATUS AND METHOD FOR FILTERING VOICEBAND AND METERING TONE FREQUENCIES OF A MIXED VOICE/DATA SIGNAL

(75) Inventor: Steven M. Swam, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/521,589

(22) Filed: Mar. 9, 2000

(51) Int. Cl.[7] .......................... H04M 1/00; H04M 3/00; H04M 11/00
(52) U.S. Cl. ................. 379/372; 379/93.05; 379/93.08; 379/130; 379/392
(58) Field of Search .................. 379/93.01, 372, 379/93.05, 93.07, 93.08, 130, 386, 392; 370/493, 494, 496, 480, 488, 497; 381/10; 333/132

(56) References Cited

U.S. PATENT DOCUMENTS

| | | | | |
|---|---|---|---|---|
| 5,497,417 A | | 3/1996 | Brahms et al. | 379/399 |
| 5,982,785 A | * | 11/1999 | Woerner et al. | 370/488 |
| 6,114,735 A | * | 9/2000 | Batra et al. | 257/411 |
| 6,567,519 B1 | * | 5/2003 | Ham | 379/372 |
| 2001/0019608 A1 | * | 9/2001 | Lofmark | 379/398 |
| 2002/0084923 A1 | * | 7/2002 | Li | 341/118 |
| 2002/0085706 A1 | * | 7/2002 | Miller | 379/382 |
| 2002/0105817 A1 | * | 8/2002 | Benton | 363/73 |
| 2002/0106072 A1 | * | 8/2002 | Apfel | 379/347 |
| 2002/0114444 A1 | * | 8/2002 | Anderson et al. | 379/398 |
| 2002/0118818 A1 | * | 8/2002 | Miller et al. | 379/387.02 |
| 2002/0118819 A1 | * | 8/2002 | Li | 379/399.01 |
| 2003/0012352 A1 | * | 1/2003 | Kiykioglu et al. | 379/114.01 |
| 2003/0035471 A1 | * | 2/2003 | Pitsoulakis | 375/222 |
| 2003/0068050 A1 | * | 4/2003 | Paoli et al. | 381/94.6 |
| 2003/0086502 A1 | * | 5/2003 | Paoli et al. | 375/257 |

FOREIGN PATENT DOCUMENTS

| | | | |
|---|---|---|---|
| EP | 0 317 852 A2 | 5/1989 | H04Q/3/58 |
| EP | 0 814 620 A2 | 12/1997 | H04Q/3/00 |
| EP | 0 891 067 A2 | 1/1999 | H04M/11/04 |
| EP | 0 909 102 A2 | 4/1999 | H04Q/1/14 |
| FR | 2 430 698 A | 2/1980 | H04B/3/02 |
| WO | WO 03/007587 A2 * | 1/2003 | H04M/15/00 |

* cited by examiner

*Primary Examiner*—Binh Tieu
(74) *Attorney, Agent, or Firm*—Fogg & Associates, LLC; Scott V. Lundberg (57) ABSTRACT

An apparatus and method provide for filtering of voiceband and specified tone frequencies of a mixed voice/data signal, such as an Asymmetric Digital Subscriber Line (ADSL) signal. A lowpass filter section passes voiceband content of the mixed signal and suppresses mixed signal content having frequencies falling within a databand of the mixed signal. A bandpass filter section is coupled to or integral with the lowpass filter section and passes the specified tone frequency, such as a metering or billing tone frequency. The lowpass and bandpass filter sections exhibit a combined frequency response that provides for a stopband between the voiceband and the metering tone frequency. The bandpass filter section effectively detunes a frequency response of the lowpass filter section to provide for the stopband. The stopband preferably provides for an insertion loss of 3 dB or greater between the voiceband and the metering tone frequency, and suppresses undesirable mixed signal content having frequencies falling within the stopband. The lowpass filter section and the bandpass filter section may each be implemented to include only passive components, such as passive magnetic components.

41 Claims, 8 Drawing Sheets

APPARATUS AND METHOD FOR FILTERING VOICEBAND AND METERING TONE FREQUENCIES OF A MIXED VOICE/DATA SIGNAL

BACKGROUND OF THE INVENTION

Various techniques have been developed within the telecommunications industry for transmitting voice and data signals to residences and businesses over existing copper telephone lines. A telecommunication service which utilizes an existing copper infrastructure is often referred to as a Plain Old Telephone Service (POTS). A telecommunications system that provides for the transmission of mixed voice/data signals utilizes a device that separates mixed voice/data signal into a lower frequency voice signal and a higher frequency data signal. Such devices are commonly referred to as POTS splitters.

An ADSL (Asymmetrical Digital Subscriber Line) service, for example, provides for the concurrent transmission of voice and data signals over conventional copper connections. A significant advantage of an ADSL service concerns the capability to provide both voice and data to a home or business using a single telephone connection. Such ADSL services require a POTS splitter to extract the voice and data signals from the mixed voice/data signal transmitted over the single telephone connection.

A common POTS splitter design employs both a lowpass filter and a highpass filter. The lowpass filter is used to extract the voice signal from the mixed voice/data signal. The highpass filter is used to extract the data signal from the mixed voice/data signal. In telecommunications systems that employ a billing tone or metering tone, the POTS splitter design must additionally provide filtering circuitry to extract the billing/metering tone. Such billing/metering tones, which generally have a frequency between the voice signal frequency band and the data signal frequency band, are commonly used in European telecommunications systems.

A typical POTS splitter filter design which accommodates billing/metering tones includes an order-n low pass filter with a corner frequency located at some point above the billing/metering tone frequency. While easy to design and implement, a significant disadvantage associated with traditional POTS splitter filter designs concerns audible "hissing" or other undesirable signal components which are passed through to the voiceband terminating device.

Unwanted spectral elements associated with frequencies between the voiceband and the databand may or may not be detectable by the human ear. However, such unwanted spectral elements pose a definite problem for data terminating devices, such as modems, fax machines, and the like. Problems associated with undesirable signal components associated with frequencies between the voiceband and the billing/metering tone frequency, for example, include degraded bit-error rate (BER) performance, lost data, and dropped connections. Such problems may adversely affect both the customer premise equipment (CPE) and the Central Office (CO) terminating equipment.

There exists a need in the telecommunications industry for an improved POTS splitter device that provides for filtering of voice, data, and billing/metering tone content of a mixed or composite voice/data signal. There exists a further need for a POTS splitter filter that effectively passes voice and billing/metering tone content while suppressing undesirable signal components associated with frequencies between the voiceband and the billing/metering tone frequency. The present invention fulfills these and other needs.

SUMMARY OF THE INVENTION

The present invention is directed to an apparatus and method for filtering voiceband and specified tone frequencies of a mixed voice/data signal. A specified tone frequency may be representative of a billing or metering tone. The mixed voice/data signal may conform to an Asymmetrical Digital Subscriber Line (ADSL) standard.

An apparatus according to an embodiment of the present invention includes a lowpass filter section that passes voiceband content of the mixed signal. The lowpass filter section suppresses mixed signal content having frequencies falling within a databand of the mixed signal. The apparatus further includes a bandpass filter section coupled with the lowpass filter section. The bandpass filter section passes the metering tone frequency.

The lowpass and bandpass filter sections further exhibit a combined or composite frequency response that provides for a stopband between the voiceband and the metering tone frequency. The bandpass filter section effectively detunes a frequency response of the lowpass filter section to provide for the stopband between the upper end of the voiceband and the metering tone frequency. The stopband suppresses undesirable mixed signal content having frequencies falling within the stopband. The stopband associated with the lowpass and bandpass filter sections preferably provides for an insertion loss of 3 dB or greater between the voiceband and the metering tone frequency.

The lowpass filter section and the bandpass filter section may each be implemented to include only passive components. For example, the lowpass and bandpass filter sections may be implemented to include passive magnetic components. The lowpass and bandpass filter sections, for example, may include a number of filter stages, wherein each stage includes a pair of coupled inductive elements and a load capacitor. The pair of coupled inductive elements and the load capacitor of at least one of the stages preferably has respective inductance and capacitance values differing from those of other stages.

In one embodiment, the bandpass filter section is integral with the lowpass filter section. According to this embodiment, the integral bandpass filter section is active upon detuning of the lowpass filter section. The passband of the bandpass filter is defined by the upper end of the stopband and the cutoff frequency of the lowpass filter section. The bandpass filter section may define a resonant tuned bandpass filter centered around the metering tone frequency. In an alternative embodiment, the lowpass and bandpass filter sections are separate filter elements coupled together.

The metering or other type of specified tone typically has a frequency specified by a telecommunications standard. The metering tone, for example, may have a frequency of about 12 kHz, 16 kHz or 20 kHz. The voiceband content of the mixed signal generally includes frequencies to about 4 or 5 kHz. The databand is generally defined to include mixed signal content having frequencies of about 30 kHz or higher.

The filtering apparatus may be configured as a 3-port filter. In this configuration, the lowpass and bandpass filter sections define two ports of the 3-port filter. A highpass filter section defines a third port of the 3-port filter.

In accordance with another embodiment of the present invention, filtering voiceband and metering tone frequencies of a mixed voice/data signal involves using a lowpass filtering response to passively filter a mixed voice/data signal to pass voiceband content of the mixed voice/data signal and to suppress mixed signal content having frequencies falling within a databand of the mixed signal. Using a bandpass filtering response, the mixed voice/data signal is passively filtered to pass the metering tone frequency. The low-pass filtering response is detuned to produce a stopband between an upper end of the voiceband and the metering tone frequency. The detuned low-pass filtering response is used to suppress undesirable mixed signal content having frequencies falling within the stopband.

Passively filtering the mixed voice/data signal to pass voiceband content of the mixed signal may involve inductively and capacitively filtering the mixed voice/data signal to pass the voiceband content. Passively filtering the mixed voice/data signal to pass the metering tone frequency may involve inductively and capacitively filtering the mixed voice/data signal to pass the metering tone frequency.

A filtering methodology of the present invention may further involve using a highpass filtering response to filter the mixed voice/data signal to pass databand content of the mixed voice/data signal and to suppress mixed signal content having frequencies falling below the databand, such as mixed signal content having frequencies of less than about 30 kHz.

In accordance with another embodiment of the present invention, a circuit for filtering voiceband and metering tone frequencies of a mixed voice/data signal includes an input interface that receives the mixed voice/data signal. The input interface may receive the mixed voice/data signal from a connection having a fixed or complex impedance. A low frequency filter circuit includes an input coupled to the input interface. The low frequency filter circuit includes a lowpass filter section and a bandpass filter section of the type described above.

The filtering circuit further includes a high frequency filter circuit that has an input coupled to the input interface. The high frequency filter circuit suppresses mixed signal content having frequencies falling below the databand. An output interface of the filtering circuit includes a low frequency output coupled to an output of the lowpass filter section and a high frequency output coupled to an output of the bandpass filter section. A voiceband signal is provided at the low frequency output of the output interface and a data signal is provided at the high frequency output of the output frequency.

In one embodiment, the input interface receives the mixed voice/data signal from a POTS (Plain Old Telephone Service) connection. In this context, the filtering circuit may be implemented within or as part of a POTS splitter circuit, module or card.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of illustrative embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Figure 1:
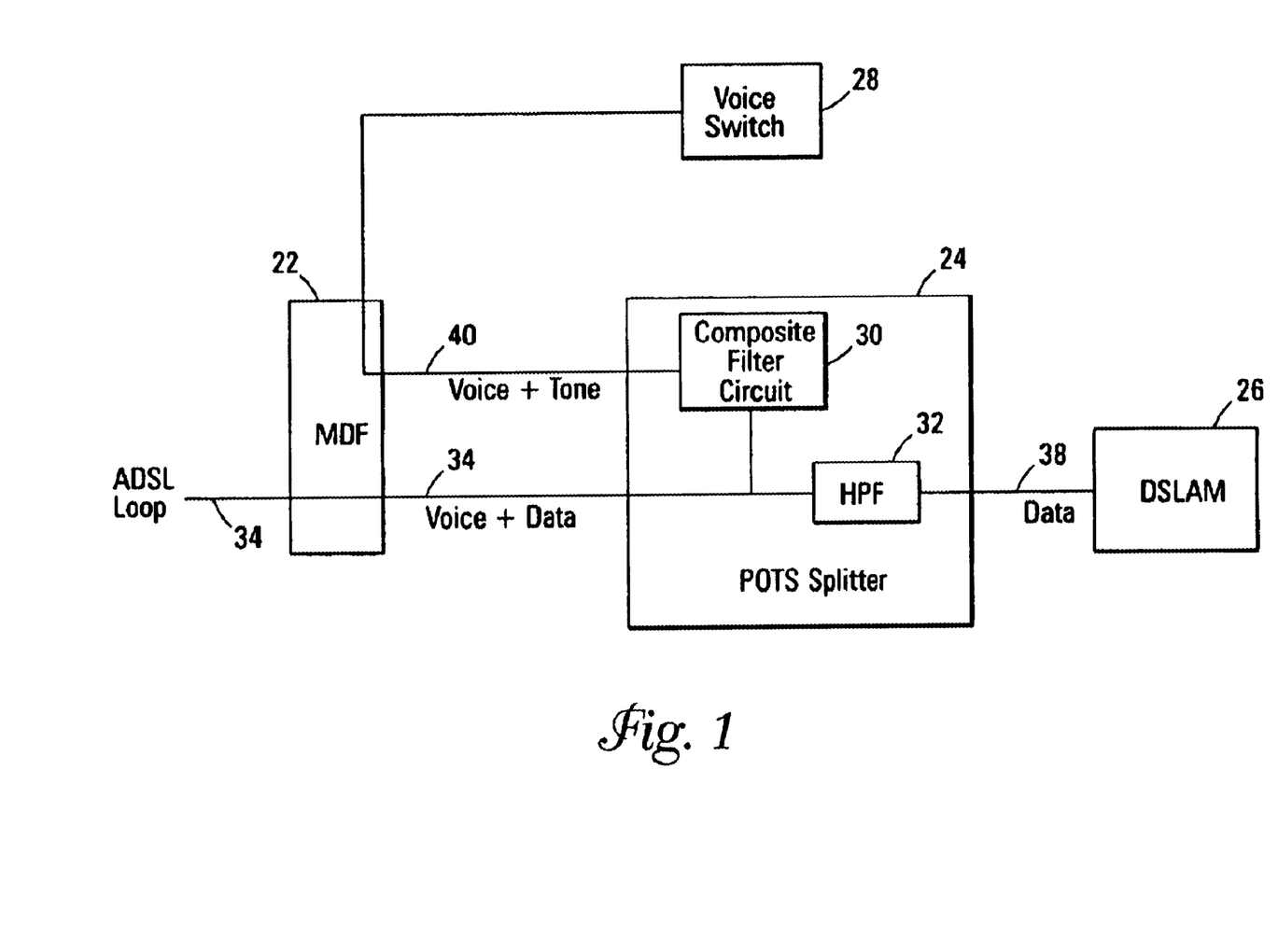
FIG. 1 is a block diagram of telecommunications system components for transmitting a mixed voice/data signal, such as an ADSL signal, and voice and data signals separated therefrom, the system including an MDF (Main Distribution Frame), a POTS (Plain Old Telephone Service) splitter for separating voice and data signals in accordance with the present invention, a DSLAM (Digital Subscriber Line Access Multiplexer) device, and a voice switch.

Referring now to FIG. 1, there is shown a block diagram of various telecommunications system components for transmitting a mixed voice/data signal, such as an ADSL signal, and for separating or splitting voice and data signals from the mixed voice/data signal. The portion of the telecommunications system 20 shown in FIG. 1 includes an MDF (Main Distribution Frame) 22, a POTS (Plain Old Telephone Service) splitter 24 for separating voice and data signals in accordance with the present invention, a DSLAM (Digital Subscriber Line Access Multiplexer) device 26, and a voice switch 28.

Figure 2:
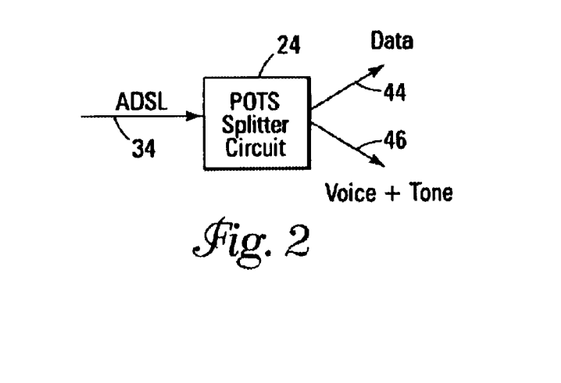
FIG. 2 is an illustration of a POTS splitter and its output signals (voice and data) in response to receiving a mixed voice/data signal, such as an ADSL signal.

A mixed voice/data signal, such as an ADSL signal 34, is transmitted from an ADSL loop to an input of MDF 22. MDF 22 transmits the mixed voice/data signal 34 to an input of POTS splitter 24. As best seen in FIG. 2, POTS splitter 24 separates a mixed voice/data signal 34 (e.g., ADSL signal) into a data signal stream 44 and a voice/tone signal stream 46.

Figure 3:
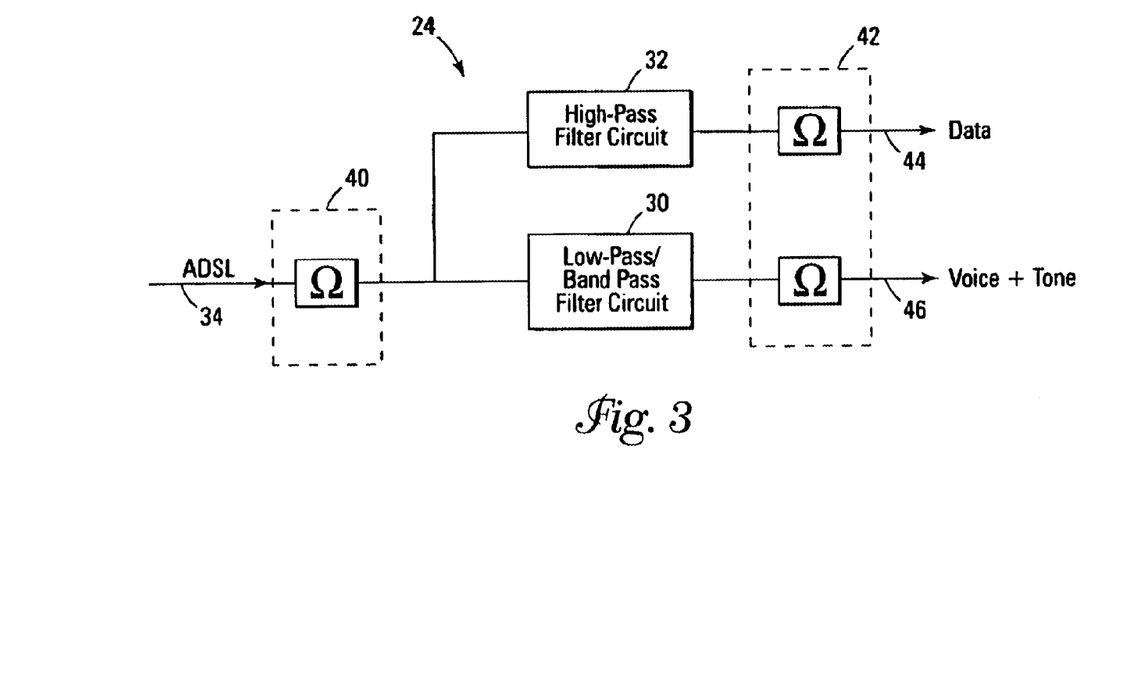
FIG. 3 is a block diagram of the POTS splitter of FIG. 2 shown in greater detail.

POTS splitter 24, as shown in FIGS. 1 and 3, includes a highpass filter 32 and a composite filter 30 of the present invention. The composite filter 30, which employs both lowpass and bandpass filtering elements, operates to separate voiceband signal content from the mixed voice/data signal 34. The composite filter 30 further operates to separate a tone of a specified frequency from the mixed voice/data signal 34.

The term tone, as used herein, may, for example, be representative of a billing tone or a metering tone. Billing tones typically have frequencies that range between the voiceband and the databand. It is understood that functions other than those associated with billing or metering may also be effected using a tone. A tone may be specified to have a particular frequency, such frequency being less than data signal frequencies of the mixed voice/data signal 34.

By way of example, billing tone frequencies of 12 kHz, 16 kHz, or 20 kHz are commonly used in European telephone system applications. It is understood that the term tone as used herein may alternatively be representative of a band-limited range of frequencies, such as frequencies in the range of 15 kHz to 17 kHz, rather than a tone defined by a single frequency. Such band-limited signal content may be used in addition to the voiceband signal content for purposes other than for billing and metering. For purposes of simplicity and not of limitation, the term tone will be generally referred to in the remaining discussion as a metering tone, it being understood that the term metering tone is intended to represent any tone having a frequency (or frequency range) less than a frequency falling within the databand.

The voice and/or tone signals 40 extracted from the mixed voice/data signal 34 are transmitted from POTS splitter 24 to a voice switch 28 via MDF 22. A data signal component is separated from the mixed voice/data signal 34 by a highpass filter 32 provided in the POTS splitter 24. The data signal 38 is transmitted from POTS splitter 24 to a digital multiplexer device 26, such as a DSLAM (Digital Subscriber Line Access Multiplexer) device.

As is further illustrated in FIG. 3, the composite filter 30, as will be described in greater detail hereinbelow, provides for lowpass filtering of the mixed voice/data signal 34 for voiceband applications and further provides for bandpass filtering of the mixed voice/data signal for tone-based applications (e.g., billing or metering tones). In one embodiment, the composite filter 30 advantageously provides for both lowpass and bandpass filtering within the same topology.

The operation of a POTS splitter device which employs a composite filtering approach according to the present invention will now be described within the context of the embodiment illustrated in FIG. 3. It is assumed for purposes of this illustrative example that the mixed voice/data signal communicated to the POTS splitter 24 conforms to an ADSL standard. It is understood that the POTS splitter 24 shown in FIG. 3 may be implemented as circuitry supported on a card or module, as a component of a digital cross-connect system or as a stand-alone unit.

An ADSL signal 34 is applied to an input interface 40 of the POTS splitter 24. The input interface 40 preferably includes impedance matching circuitry to provide for proper impedance matching between the ADSL signal connection and the POTS splitter circuitry. The input interface 40 is configurable to provide for matching of fixed or complex connection impedances. For example, the input interface may be configured to accommodate a complex input impedance conforming to a European harmonized impedance reference specification.

The ADSL signal 34 received by the input interface 40 is communicated to a highpass filter 32 which operates on the ADSL signal 34 to pass only the databand signal content of the ADSL signal 34. The databand signal content is communicated from the highpass filter 32 to an output interface 42. The output interface 42 includes a data output port 44 which provides external access to the data signal 44. The output interface 42 may include impedance matching circuitry to provide for proper matching of fixed or complex impedances between the data output port 44 and a data line connection coupled thereto.

The ADSL signal 34 received by the input interface 40 is also communicated to a composite filter 30 of the POTS splitter 24. According to the embodiment depicted in FIG. 3, a lowpass filtering response of the composite filter 30 passes ADSL signal content associated with a voiceband defined by ADSL signal frequencies of up to about 4 or 5 kHz (nominally about 4 kHz). In addition, a bandpass filtering response of the composite filter 30 passes ADSL signal content associated with a specified tone, such as a billing or metering tone, which has a frequency falling between the voiceband and the databand (e.g., tone frequencies of 12 kHz, 16 kHz or 20 kHz).

Voiceband and tone signal content extracted from the ADSL signal 34 by the composite filter 30 is communicated to a voice output port 46 of the output interface 42. The output interface 42 may include impedance matching circuitry to provide for proper matching of fixed or complex impedances between the voice output port 46 and a voice line connection coupled thereto.

Figure 4:
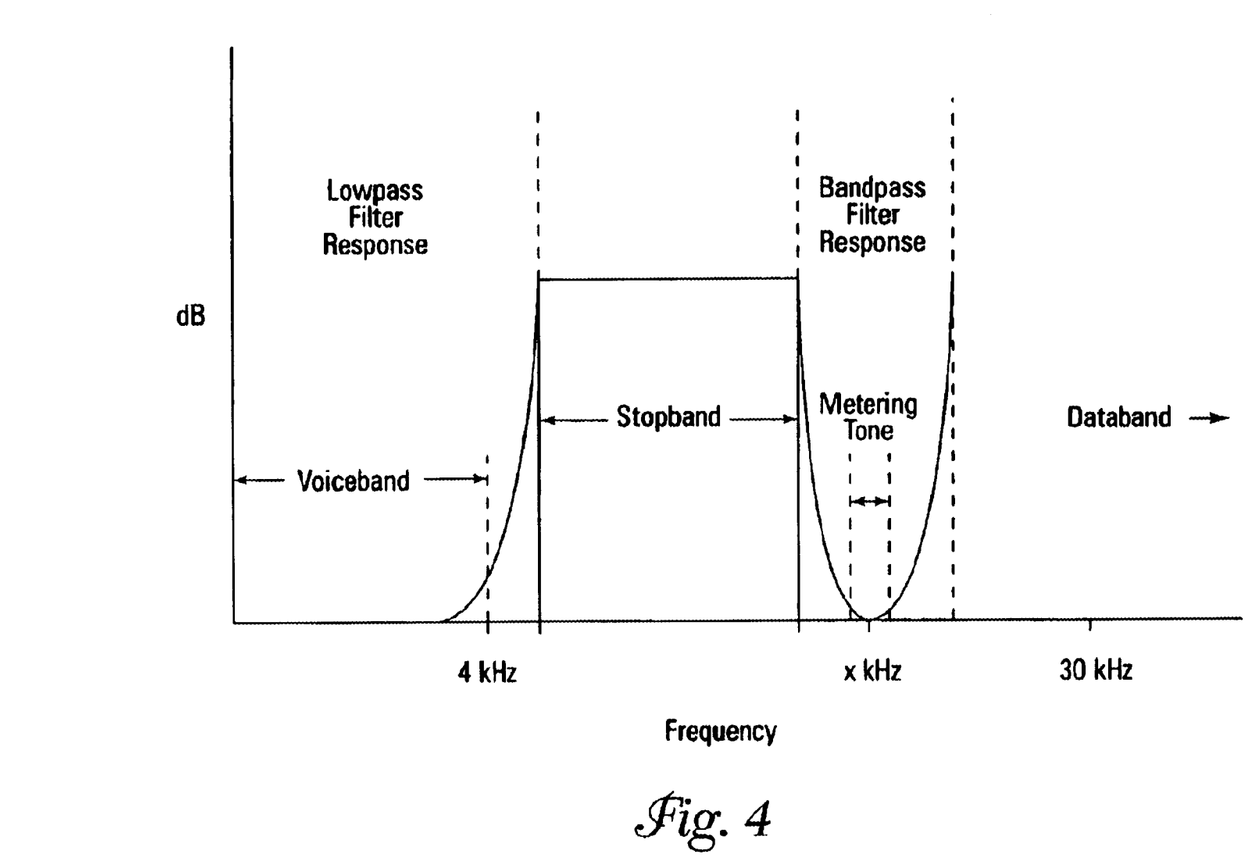
FIG. 4 is an exaggerated depiction of the filter characteristics of a composite filter which exhibits both lowpass and bandpass filter responses in accordance with an embodiment of the present invention.

A unique aspect of composite filter 30, which is depicted in graphical form in FIG. 4, concerns the combination of lowpass and bandpass filtering responses of the filter 30 which provides for a stopband between the voiceband and the metering tone frequency. This stopband advantageously suppresses undesirable ADSL signal content, such as unwanted spectral impurities, falling within the frequency region above the upper end of the voiceband and below the metering tone frequency.

FIG. 4 is an exaggerated depiction of the frequency response of composite filter 30 shown in FIGS. 1 and 3. According to this illustrative example, the lowpass filtering response of composite filter 30 exhibits a cutoff frequency of about 4 kHz. The bandpass filtering response of the composite filter 30 is centered around the metering tone, shown as having a frequency of x kHz, where x represents any frequency falling between about 4 kHz and the lower end frequency of the databand (e.g., 30 kHz). For example, the bandpass filtering response of the composite filter 30 may be centered around a tone frequency of 12 kHz, 16 kHz or 20 kHz. The transition band between the lowpass filter cutoff frequency and the stopband, as well as the transition band between the stopband and the lower stop band of the bandpass filter are ignored in this discussion for purposes of clarity.

Figure 5:
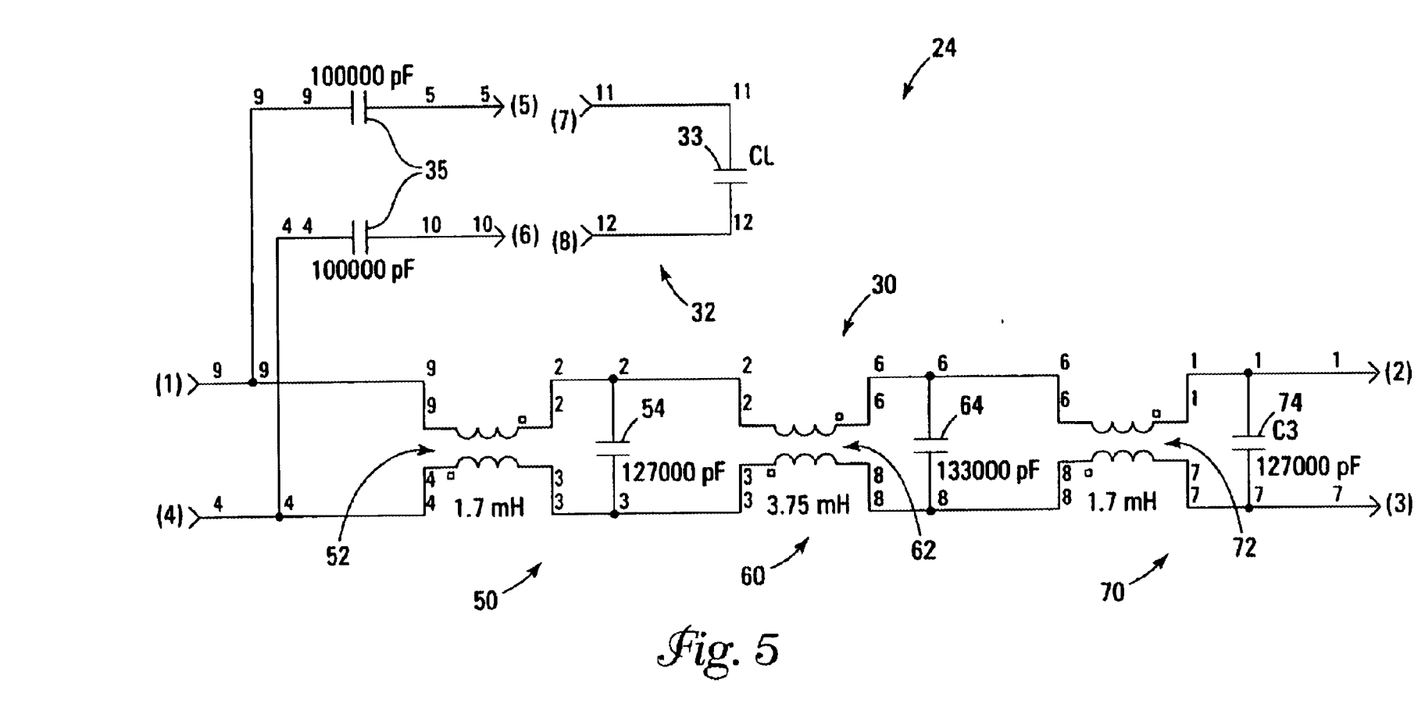
FIG. 5 is a schematic depiction of a composite filter according to an embodiment of the present invention.

Turning now to FIG. 5, there is shown a schematic depiction of a POTS splitter circuit 24 in accordance with an embodiment of the present invention. According to this embodiment, POTS splitter circuit 24 is implemented to comply with a European harmonized reference specification. POTS splitter circuit 24 includes a highpass filter section 32 and a composite filter section 30. Connection nodes (1) and (2) provide for connectivity between the POTS splitter circuit 24 and an outside telephone line pair. Connection nodes (5) and (6) of the highpass filter section 32 provide for the communication of databand signals from the POTS splitter circuit 24 to a modem, such as an ADSL modem situated in a user's home or office. Connection nodes (2) and (3) of the composite filter section 30 provide for the communication of voiceband and metering tone signals from the POTS splitter circuit 24 to a POTS line terminating device, such as a telephone, fax machine, or voiceband modem situated in the user's home or office.

Figure 6:
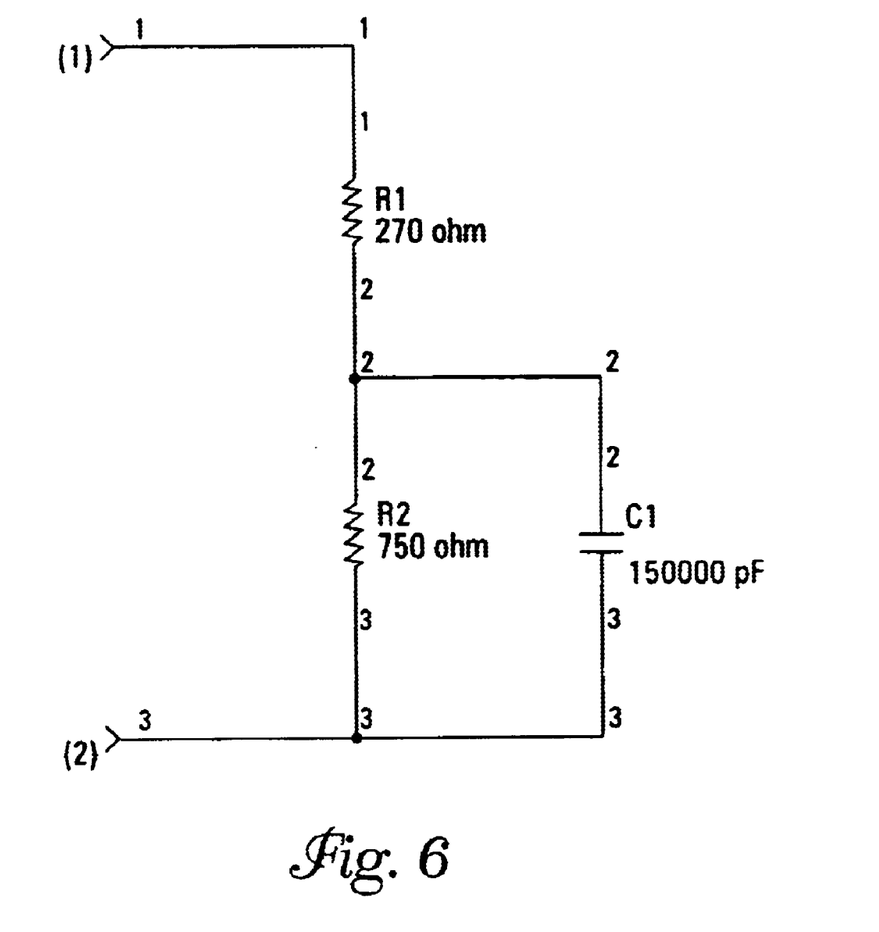
FIG. 6 is a schematic depicting the input impedance as seen by the circuit of FIG. 5 according to a European harmonized impedance reference specification.

In conformance with the European harmonized reference model, the highpass filter section 32 of the POTS splitter circuit 24 includes two 100 nano-farad (nF) capacitors 35 and a third capacitor (CL) 33. Capacitor 33 is typically xDSL modem dependent or locale/country dependent, and may be varied to accommodate a specified complex input impedance. For example, FIG. 6 shows a schematic of an RC circuit which represents a complex input impedance as seen by the POTS splitter circuit 24 of FIG. 5 in accordance with a European harmonized impedance reference specification. The combined capacitance of the two capacitors 35 and capacitor (CL) 33 must fall between about 27–34 nF, however derived, to be in compliance with this particular specification.

The composite filter section 30 in this embodiment exhibits a lowpass filter response that passes voiceband frequencies of up to about 4 kHz. A bandpass or notch filter response of composite filter section 30 passes a metering tone frequency of about 16 kHz. The lowpass filter response of composite filter section 30 rejects frequencies beyond the 16 kHz metering tone frequency and provides for a high frequency stopband (at or above 30 kHz) having sufficient insertion loss so as not to interfere with the ADSL databand signal content. An illustration of the insertion loss characteristics of composite filter section 30 is shown in FIG. 8.

Figure 8:
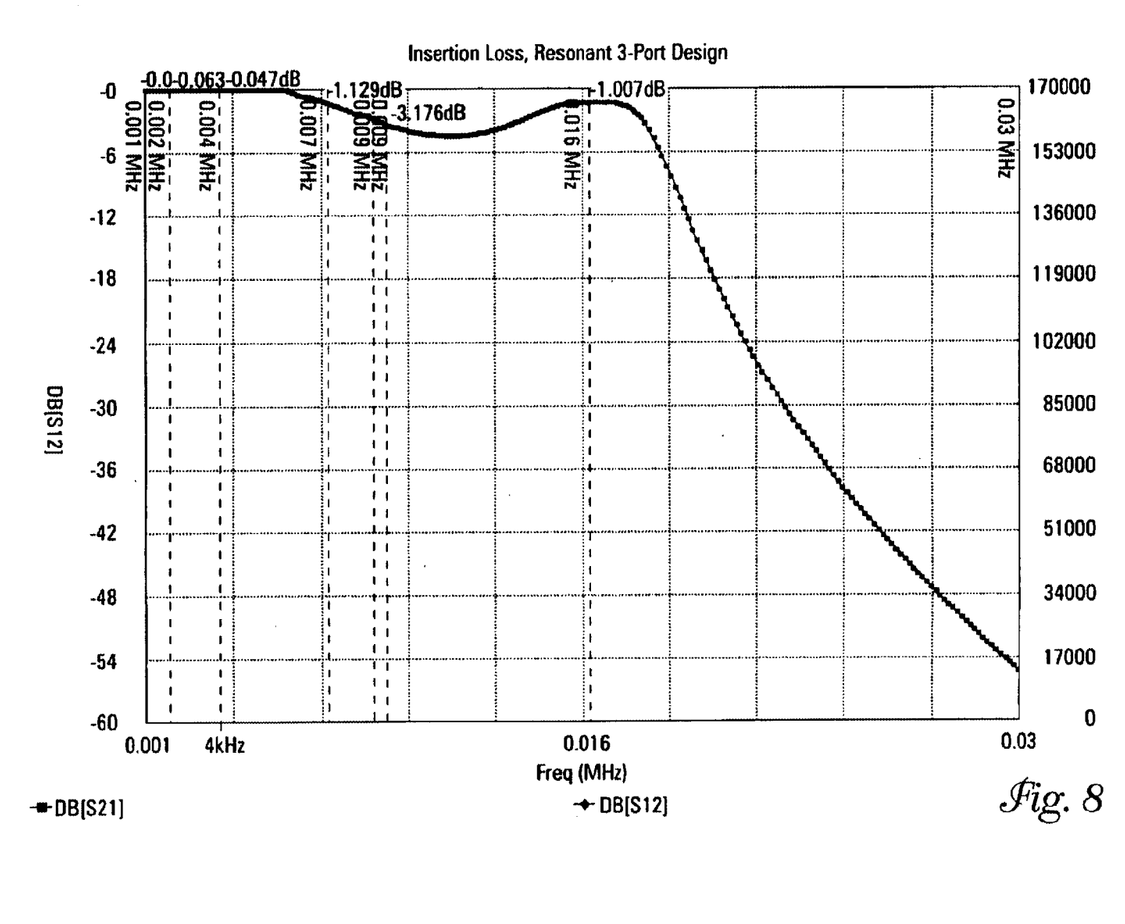
FIG. 8 is an illustration of the insertion loss characteristics of the filter shown in FIG. 5 after the filter is "detuned" in accordance with the principles of the present invention.

One skilled in the art will readily appreciate the uniqueness of the characteristic "dip" in the insertion loss curve which can be clearly seen in FIG. 8. This unique dip is shown to extend from the upper end of the voiceband (at ~4 kHz) to just before the metering tone frequency (at ~15.5 kHz). This dip in the insertion loss curve defines a stopband between the voiceband and the metering tone frequency. This unique stopband or dip in the insertion loss curve shown in FIG. 8 results from an unconventional process of "detuning" the response of the composite filter section 30 of FIG. 5 in accordance with the principles of the present invention.

At first glance, the lowpass filter section 30 of composite filter 24 looks like a traditional order-n lowpass filter with an input impedance designed in accordance with the European harmonized impedance reference shown in FIG. 6. If, however, the skilled artisan were to follow a standard design approach to such a filter, the resulting filter implementation would not suffice, as the desired rejection between the voiceband (at ~4 kHz nominal) and the metering tone frequency (at ~15.5 kHz nominal) could not be achieved (see, e.g., A. Williams and F. Taylor, "Electronic Filter Design Handbook, $3^{rd}$ Edition," McGraw-Hill Company, May 1995, chapter 3, section 3.1. Detuning the response of the lowpass filter section 30 of composite filter 24 according to the present invention, however, provides for a filter that exhibits the desired rejection between the voiceband and the metering tone frequency.

The lowpass filter section 30 includes three stages 50, 60, and 70. Each of the three stages 50, 60, 70 includes coupled inductor elements 52, 62, 72, and a load capacitor 54, 64, 74, respectively. The first and third stages 50 and 70 respectively include two coupled inductors 52, 72 each having an inductance value of 1.7 milli-Henry (mH) and a load capacitor 54, 74 having a capacitance value of 27 nF. Importantly, the second stage 60 includes two coupled inductors 62 each having an inductance value of 3.75 mH and a load capacitor 64 having a capacitance value of 33 nF.

Given the above component values, and a capacitance value of 27 nF for the combined capacitance of capacitors 35 and capacitor (CL) 33 of the highpass filter section 32, the composite filter section 30 passes the 16 kHz metering tone, while providing the requisite matching impedance in conformance with the complex impedance specification across the standard 0–4 kHz voiceband. The effective detuning of the composite filter's response by appropriate selection of capacitance values for capacitors 64, 33, and 35 provides for greater than 3 dB of insertion loss in the 4 kHz to 15.5 kHz stopband, as is demonstrated in FIG. 8. It is noted that the detuned lowpass filter section results in a resonant tuned bandpass filter centered around the 16 kHz billing/metering tone.

Figure 9:
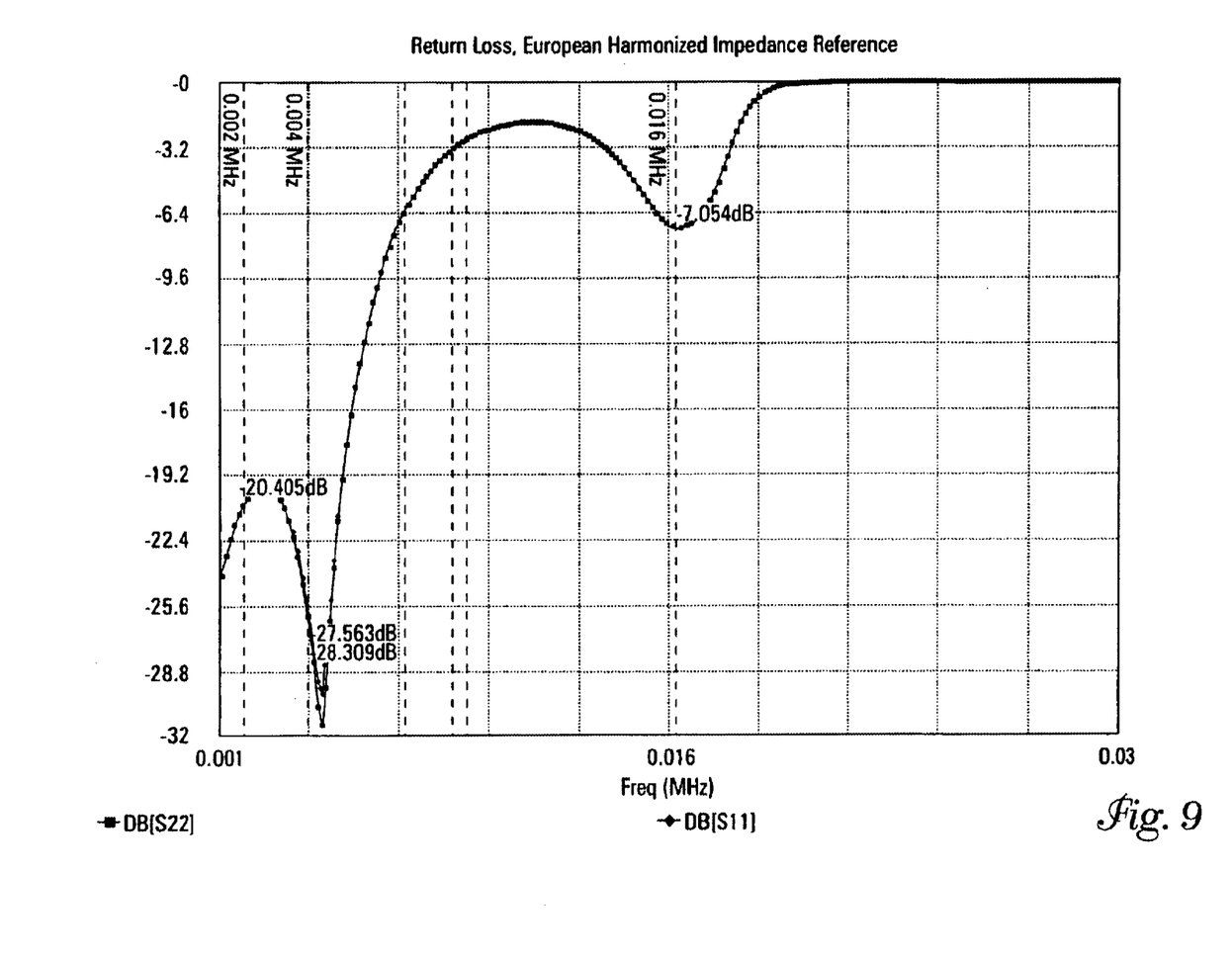
FIG. 9 is an illustration of the return loss characteristics of the detuned filter of FIG. 5 which demonstrates compliance with return loss characteristics of a European harmonized impedance reference specification.

Care must also be taken to reduce return loss. The return loss characteristics of the POTS splitter 24 must be taken into account in order to meet the requirements of an applicable standard. For example, the filter implementation depicted in FIG. 5 satisfies the return loss characteristics shown in FIG. 9 which are based on complex loop impedance characteristics as specified in ITu-T Recommendation Q.552, "Series Q: Switching and Signaling, Digital Exchanges—Transmission Characteristics: Transmission Characteristics at 2-wire Analogue Interfaces of Digital Exchanges," International Telecommunication Union, November 1996.

Figure 7:
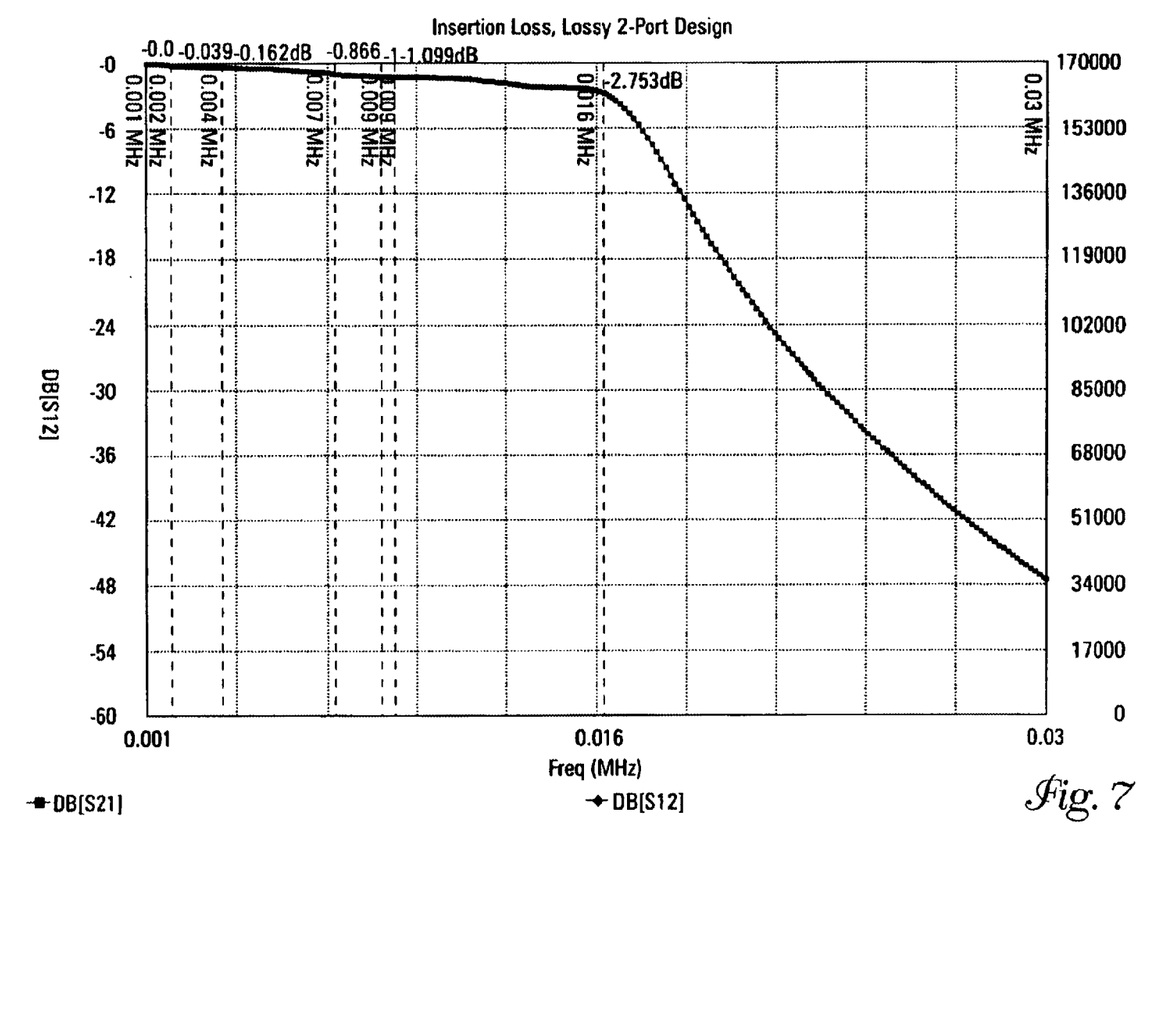
FIG. 7 is an illustration of the insertion loss characteristics of the filter shown in FIG. 5 prior to "detuning" in accordance with the principles of the present invention.

In general, a POTS splitter filter of the present invention may be designed using standard filter design methodologies with one notable exception. First, a desired insertion loss curve is determined that meets voiceband and metering tone frequency requirements of a give application. Using known computer modeling techniques, an order-n polynomial is derived, such as by use of the LaGrange form of constructing the interpolating polynomial. Next, instead of directly synthesizing the filter based on this polynomial, a second and third polynomial of a 2-port lossy network, such as one having insertion loss characteristics shown in FIG. 7, and $3^{rd}$ port capacitance characteristics are derived, such as by use of averaging and linearizing over the frequency range of interest. A fourth polynomial is then derived to create a set of compensating coefficients, from which the order-n LC circuit of the composite filter section is derived.

Using these methodologies, together with standard capacitance values, a set of custom magnetic components of appropriate value may be acquired to implement POTS splitter filter circuitry that meets any of a number of different industry standards. Commonly known differential circuit/magnetic topologies may be used to achieve other objectives of the overall design, including sufficient longitudinal balance, DC isolation, and accommodation of ringing voltages, for example.

A POTS splitter filter implemented in accordance with the principles of the present invention accommodates both lowpass filtering for voiceband applications of ADSL and bandpass billing/metering tone filtering within the same topology. A POTS splitter filter implemented in accordance with the present invention allows for adaptation to both fixed and complex impedance networks. A design methodology of the present invention allows for the same topology to be used with various billing/metering tone frequencies and voiceband limits. With the use of standard components, a design methodology of the present invention allows the designer to control the amount of return loss seen by the terminating network.

A POTS Splitter filter implemented in accordance with the present invention has the further advantage of suppressing unwanted spectral impurities/frequencies in the region located above the voiceband and below the billing/metering tone frequency. A design methodology of the present invention accounts for minimized insertion and maximized return losses in the desired frequency ranges, and offers high longitudinal balance and low passband ripple. Application of this topology to different order filters may, depending on component selection, offer a higher order of immunity, steeper transition bands, and other performance improvements.

It is to be understood, that even though numerous characteristics and advantages of the invention have been set forth in the foregoing description, together with details of the structure and function of the present invention, the disclosure is illustrative only, and changes may be made in detail, especially in matters as such shape, size, arrangement, and fiction of the parts within the principles of the invention to the full extent indicated by the broad general meaning of the terms in which the appended claims are expressed.

What is claimed is:

1. A circuit for filtering both voiceband and metering tone frequencies of a mixed voice/data signal the circuit comprising:
    a lowpass filter section that passes voiceband content of the mixed signal, the lowpass filter section suppressing mixed signal content having frequencies falling within a databand of the mixed signal;
    a bandpass filter section coupled with the lowpass filter section, the bandpass filter section passing the metering tone frequency, the lowpass and bandpass filter sections farther exhibiting a frequency response that provides for a stopband between the voiceband and the metering tone frequency, the stopband suppressing undesirable mixed signal content associated with frequencies falling within the stopband; and
    wherein the bandpass filter section is integral with the lowpass filter section.

2. The circuit of claim 1, wherein the lowpass filter section and the bandpass filter sections each comprise only magnetic components.

3. The circuit of claim 1, wherein the bandpass filter section comprises passive magnetic components.

4. The circuit of claim 1, wherein the bandpass filter section effectively detunes a frequency response of the lowpass filter section to provide for the stopband between the upper and of the voiceband and the metering tone frequency.

5. The circuit of claim 1, wherein the bandpass filter section comprises a bandpass resonator.

6. The circuit of claim 1, wherein the bandpass filter section comprises a resonant tuned bandpass filter centered around the metering tone frequency.

7. The circuit of claim 1, wherein the lowpass filter section passes voiceband content of the mixed signal to about 4 kHz.

8. The circuit of claim 1, wherein the lowpass and bandpass filter sections comprise a plurality of stages, each stage comprising a pair of coupled inductive elements and a load capacitor.

9. The circuit of claim 8, wherein the pair of coupled inductive elements and the load capacitor of at least one of the stages have respective inductance and capacitance values differing from those of other stages.

10. The circuit of claim 1, wherein the bandpass filter section passes a metering tone having a frequency specified by a telecommunications standard.

11. The circuit of claim 1, wherein the bandpass filter section passes a metering tone having a frequency of about 12 kHz or about 16 kHz.

12. The circuit of claim 1, wherein the bandpass filter section passes a metering tone having a frequency of about 20 kHz.

13. The circuit of claim 1, wherein the databand comprises mixed signal content having frequencies of about 30 kHz or higher.

14. The circuit of claim 1, wherein the circuit is configured as a 3-port filter, the lowpass and bandpass filter sections defining two ports of the 3-port filter and a highpass filter section defining a third port of the 3-port filter.

15. The circuit of claim 1, wherein the mixed voice/data signal conforms to an Asymmetrical Digital Subscriber Line (ADSL) standard.

16. A circuit for filtering both voiceband and metering tone frequencies of a mixed voice/data signal the circuit comprising:
    a lowpass filter section that passes voiceband content of the mixed signal, the lowpass filter section suppressing mixed signal content having frequencies falling within a databand of the mixed signal; and
    a bandpass filter section coupled with the lowpass filter section, the bandpass filter section passing the metering tone frequency, the lowpass and bandpass filter sections further exhibiting a frequency response that provides for a stopband between the voiceband and the metering tone frequency, the stopband suppressing undesirable mixed signal content associated with frequencies falling within the stopband; and wherein the stopband associated with the lowpass and bandpass filter sections provides for an insertion loss of 3 dB or greater between the voiceband and the metering tone frequency.

17. A method of filtering voiceband and metering tone frequencies of a mixed voice/data signal, comprising:
    passively filtering, using a lowpass filtering response, the mixed voice/data signal to pass voiceband content of the mixed voice/data signal and to suppress mixed signal content having frequencies falling within a databand of the mixed signal;
    passively filtering, using a bandpass filtering response, the mixed voice/data signal to pass the metering tone frequency;
    detuning the low-pass filtering response to produce a stopband between an upper end of the voiceband and the metering tone frequency; and
    suppressing, using the detuned low-pass filtering response, undesirable mixed signal content associated with frequencies falling within the stopband.

18. The method of claim 17, wherein the stopband provides for an insertion loss of 3 dB or greater between the voiceband and the metering tone frequency.

19. The method of claim 17, wherein voiceband content of the mixed signal comprises frequencies to about 4 or 5 kHz.

20. The method of claim 17, wherein passively filtering the mixed voice/data signal to pass voiceband content of the mixed voice/data signal comprises inductively and capacitively filtering the mixed voice/data signal to pass voiceband content of the mixed voice/data signal.

21. The method of claim 17, wherein the metering tone defines a frequency specified by a telecommunications standard.

22. The method of claim 17, wherein the metering tone defines a frequency of about 12 KHz or about 16 kHz.

23. The method of 17, wherein the metering tone defines a frequency of about 20 kHz.

24. The method of claim 17, wherein passively filtering the mixed voice/data signal to pass the metering tone frequency comprises inductively and capacitively filtering the mixed voice/data signal to pass the metering tone frequency.

25. The method of claim 17, wherein the mixed voice/data signal conforms to an Asymmetrical Digital Subscriber Line (ADSL) standard.

26. The method of claim 17, wherein the databand comprises mixed signal content having frequencies of about 30 kHz or higher.

27. The method of claim 17, further comprising filtering, using a highpass filtering response, the mixed voice/data signal to pass databand content of the mixed voice/data signal and to suppress mixed signal content having frequencies falling below the databand.

28. A circuit for filtering both voiceband and metering tone frequencies of a mixed voice/data signal, the circuit comprising:
    an input interface that receives the mixed voice/data signal;
    a low frequency filter circuit including an input coupled to the input interface, the low frequency filter circuit comprising:
        a lowpass filter section that passes voiceband content of the mixed signal, the lowpass filter section suppressing mixed signal content having frequencies falling within a databand of the mixed signal; and
        a bandpass filter section coupled with the lowpass filter section, the bandpass filter section passing the metering tone frequency, the lowpass and bandpass filter sections further exhibiting a frequency response that provides for a stopband between the voiceband and the metering tone frequency, the stopband suppressing undesirable mixed signal content associated with frequencies falling within the stopband;
    a high frequency filter circuit including an input coupled to the input interface, the high frequency filter circuit suppressing mixed signal content having frequencies falling below the databand;
    an output interface having a low frequency output coupled to an output of the lowpass filter section and a high frequency output coupled to an output of the bandpass filter section, a voiceband signal provided at the low frequency output of the output interface and a data signal provided at the high frequency output of the output frequency; and
    wherein the bandpass filter section is integral with the lowpass filter section.

29. The circuit of claim 28, wherein the lowpass filter section and the bandpass filter section each comprise only passive components.

30. The circuit of claim 28, wherein the bandpass filter section comprises passive magnetic components.

31. The circuit of claim 28, wherein the bandpass filter section comprises a bandpass resonator.

32. The circuit of claim 28, wherein the bandpass filter section passes a metering tone having a frequency specified by a telecommunications standard.

33. The circuit of claim 28, wherein the bandpass filter section passes a metering tone having a frequency of about 12 kHz or about 16 kHz.

34. The circuit of claim 28, wherein the bandpass filter section passes a metering tone having a frequency of about 20 kHz.

35. The circuit of claim 28, wherein the lowpass and bandpass filter sections comprise a plurality of stages, each stage comprising a pair of coupled inductive elements and a load capacitor.

36. The circuit of claim 35, wherein the pair of coupled inductive elements and the load capacitor of at least one of the stages have respective inductance and capacitance values differing from those of other stages.

37. The circuit of claim 28, wherein the databand comprises mixed signal content having frequencies of about 30 kHz or higher.

38. The circuit of claim 28, wherein the mixed voice/data signal conforms to an Asymmetrical Digital Subscriber Line (ADSL) standard.

39. The circuit of claim 28, wherein the input interface receives the mixed voice/data signal from a POTS (Plain Old Telephone Service) connection.

40. The circuit of claim 28, wherein the input interface receives the mixed voice/data signal from a connection having a fixed or complex impedance.

41. A circuit for filtering both voiceband and metering tone frequencies of a mixed voice/data signal, the circuit comprising:
    an input interface that receives the mixed voice/data signal;
    a low frequency filter circuit including an input coupled to the input interface, the low frequency filter circuit comprising:
        a lowpass filter section that passes voiceband content of the mixed signal, the lowpass filter section suppressing mixed signal content having frequencies falling within a databand of the mixed signal; and
        a bandpass filter section coupled with the lowpass filter section, the bandpass filter section passing the metering tone frequency, the lowpass and bandpass filter sections further exhibiting a frequency response that provides for a stopband between the voiceband and the metering tone frequency, the stopband suppressing undesirable mixed signal content associated with frequencies falling within the stopband;
    a high frequency filter circuit including an input coupled to the input interface, the high frequency filter circuit suppressing mixed signal content having frequencies falling below the databand;
    an output interface having a low frequency output coupled to an output of the lowpass filter section and a high frequency output coupled to an output of the bandpass filter section, a voiceband signal provided at the low frequency output of the output interface and a data signal provided at the high frequency output of the output frequency; and
    wherein the stopband associated with the lowpass and bandpass filter sections provides for an insertion loss of 3 dB or greater between the voiceband and the metering tone frequency.

* * * * *

UNITED STATES PATENT AND TRADEMARK OFFICE
CERTIFICATE OF CORRECTION

| | |
|---|---|
| PATENT NO. | : 6,728,367 B1 |
| APPLICATION NO. | : 09/521589 |
| DATED | : April 27, 2004 |
| INVENTOR(S) | : Swam |

Page 1 of 1

It is certified that error appears in the above-identified patent and that said Letters Patent is hereby corrected as shown below:

At Claim 1, Column 9, Line 32, replace the first occurrence of "farther" with --further--

At Claim 4, Column 9, line 47, replace the first occurrence of "and" with --end--

Signed and Sealed this

Twenty-eighth Day of October, 2008

JON W. DUDAS
*Director of the United States Patent and Trademark Office*